United States Patent [19]

Chen et al.

[11] Patent Number: 5,761,329

[45] Date of Patent: Jun. 2, 1998

[54] METHOD AND APPARATUS EMPLOYING AUDIO AND VIDEO DATA FROM AN INDIVIDUAL FOR AUTHENTICATION PURPOSES

[76] Inventors: Tsuhan Chen, 153 Four Winds Dr., Middletown, N.J. 07748; Mehmet Reha Civanlar, 85 Coleman Ave., Middletown, N.J. 07701

[21] Appl. No.: 572,982

[22] Filed: Dec. 15, 1995

[51] Int. Cl.$^6$ ................................................. G06K 9/00
[52] U.S. Cl. ............................................. 382/116; 382/118
[58] Field of Search ............................... 382/115, 116, 382/118; 340/825.3, 825.34

[56] References Cited

U.S. PATENT DOCUMENTS

| | | | |
|---|---|---|---|
| 4,020,463 | 4/1977 | Himmel | 382/118 |
| 4,100,370 | 7/1978 | Suzuki et al. | 382/115 |
| 4,449,189 | 5/1984 | Feix et al. | 382/118 |
| 4,975,969 | 12/1990 | Tal | 382/118 |
| 4,993,068 | 2/1991 | Piosenka et al. | 382/116 |
| 5,410,609 | 4/1995 | Kado et al. | 382/118 |
| 5,412,738 | 5/1995 | Brunelli et al. | 382/115 |

OTHER PUBLICATIONS

Chen et al., "Lip Synchronization Using Speech-Assisted Video Processing", *IEEE Signal Processing Letters*, vol. 2, No. 4, Apr. 1995, pp. 57-59.

Rabiner et al., *Digital Processing of Speech Signals*, pp. 366-369.

Primary Examiner—Joseph Mancuso

[57] ABSTRACT

A method and apparatus is provided for determining the authenticity of an individual. In accordance with the method, audio and video data of the individual speaking at least one selected phrase is obtained. Identifying audio features and video features are then extracted from the audio data and the video data, respectively. A feature vector is formed which incorporates both the audio features and the video features. The feature vector is compared to a stored feature vector of a validated user speaking the same selected phrase. The individual is authenticated if the feature vector and the stored feature vector form a match within a prescribed threshold.

23 Claims, 3 Drawing Sheets

MOUTH MODEL

TIME VARIATION OF THE DISTANCE BETWEEN TWO LIP POINTS

METHOD AND APPARATUS EMPLOYING AUDIO AND VIDEO DATA FROM AN INDIVIDUAL FOR AUTHENTICATION PURPOSES

TECHNICAL FIELD

The present invention relates generally to a method for authenticating an individual and more particularly to a method for authenticating an individual that employs both audio and video data.

BACKGROUND OF THE INVENTION

Recent proliferation of World Wide Web based services has increased the need for electronic authentication techniques. For many applications, e.g., the distribution of multimedia material over the Internet, it is important to restrict access to a group of registered, e.g., paying, customers. To date, encryption methods for password based authentication have been the focus for most of the work in this area. Since using the same password for several applications can void the security provided by the encryption, these techniques require users to remember an ever-increasing number of passwords associated with each service to which he or she is subscribed.

Known authentication procedures are either based on images (e.g., finger prints, irises, ears, face profiles, geometry of facial features, etc.), or on voice data. Authentication procedures based on either still images or voice alone can be circumvented, however, since it is easy to store and use prerecorded images. Also, with respect to voice authentication procedures, it is possible to rearrange phonemes of an individual from a prerecorded speech sample to generate new phrases. Additionally, voice-only authentication systems can fail under acoustic noise or echo.

SUMMARY OF THE INVENTION

The present invention provides a method and apparatus for determining the authenticity of an individual. In accordance with the method, audio and video data of the individual speaking at least one selected phrase is obtained. Identifying audio features and video features are then extracted from the audio data and the video data, respectively. A feature vector is formed which incorporates both the audio features and the video features. The feature vector is compared to a stored feature vector of a validated user speaking the same selected phrase. The individual is authenticated if the feature vector and the stored feature vector form a match within a prescribed threshold.

The selected phrase or password may be chosen by the individual or it may be predetermined. In some embodiments of the invention the extraction of identifying audio features may include the measurement of variations in distance among a plurality of points on the lips of the individual. Additionally, extraction of identifying audio features may employ LPC cepstrum coefficients. The comparison of the feature vector to the stored vector may be performed by a variety of techniques including time-warped mapping.

DETAILED DESCRIPTION

In accordance with the present invention, both audio data and video data are employed to determine the authenticity of an individual. Similar to the selection of a password in a conventional authorization system, an individual to be authorized must first create a record of audio and video data that can be stored in a database for subsequent comparison when the individual attempts authorization. When the user subsequently attempts to obtain authentication or validation, he or she repeats the phrase or password and this data is compared against the stored voice and synchronized video data. If the authenticating data matches the stored data within a prescribed threshold, authentication or validation is verified. The video and audio data stored in the database may be a recording of the individual speaking a phrase or password that may be user selected or preselected.

When the individual attempts authorization the comparison that must be performed between the stored data and the individual's repetition of the phrase or password may be accomplished in a number of different ways. For example, as set forth in the flowchart of FIG. 1, one embodiment of the invention is based on the interaction of the individual's voice and video of lip movements associated therewith, i.e., lip synchronization.

Figure 1:
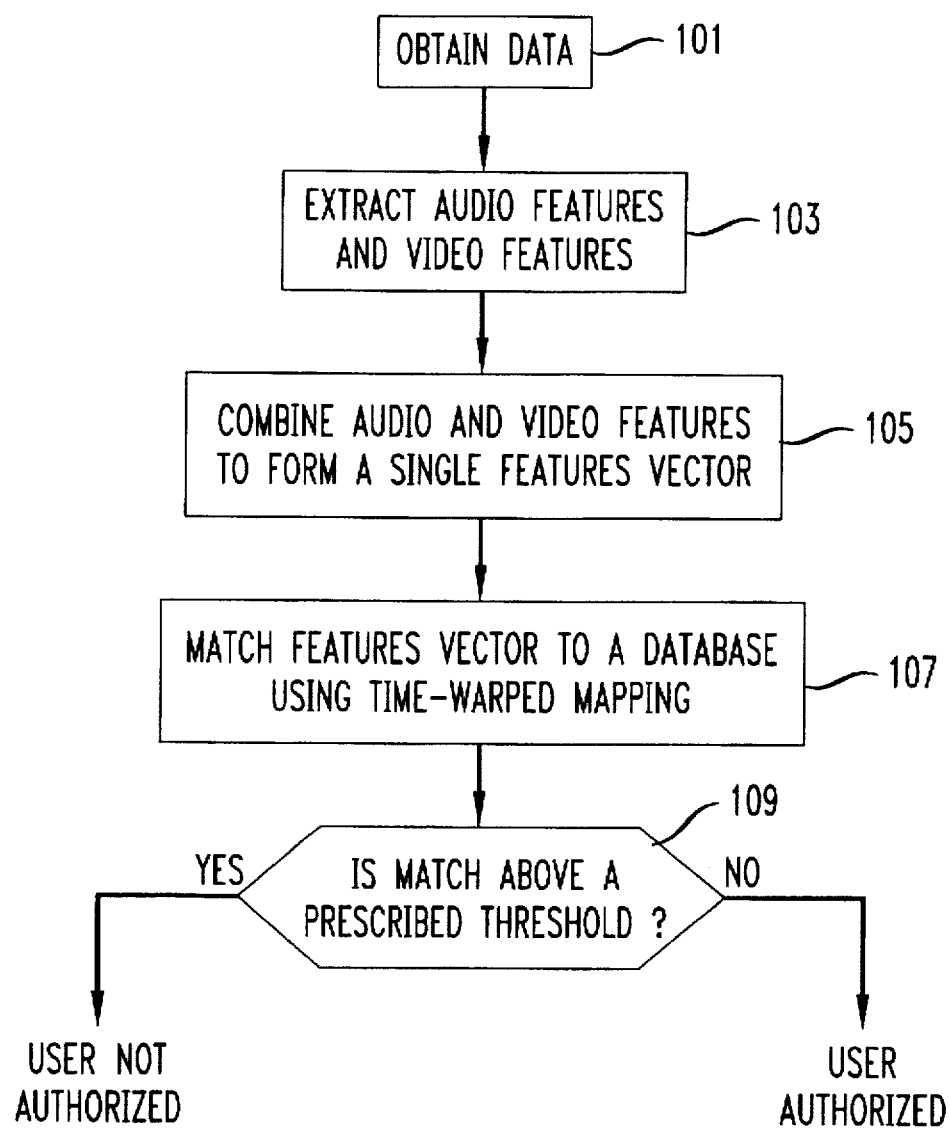
FIG. 1 shows a flowchart illustrating the method of the present invention.
Figure 2:
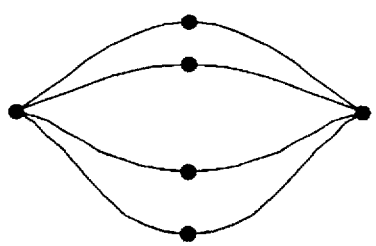
FIG. 2 shows an example of the points on a mouth that may be used to extract the video data.
Figure 3:
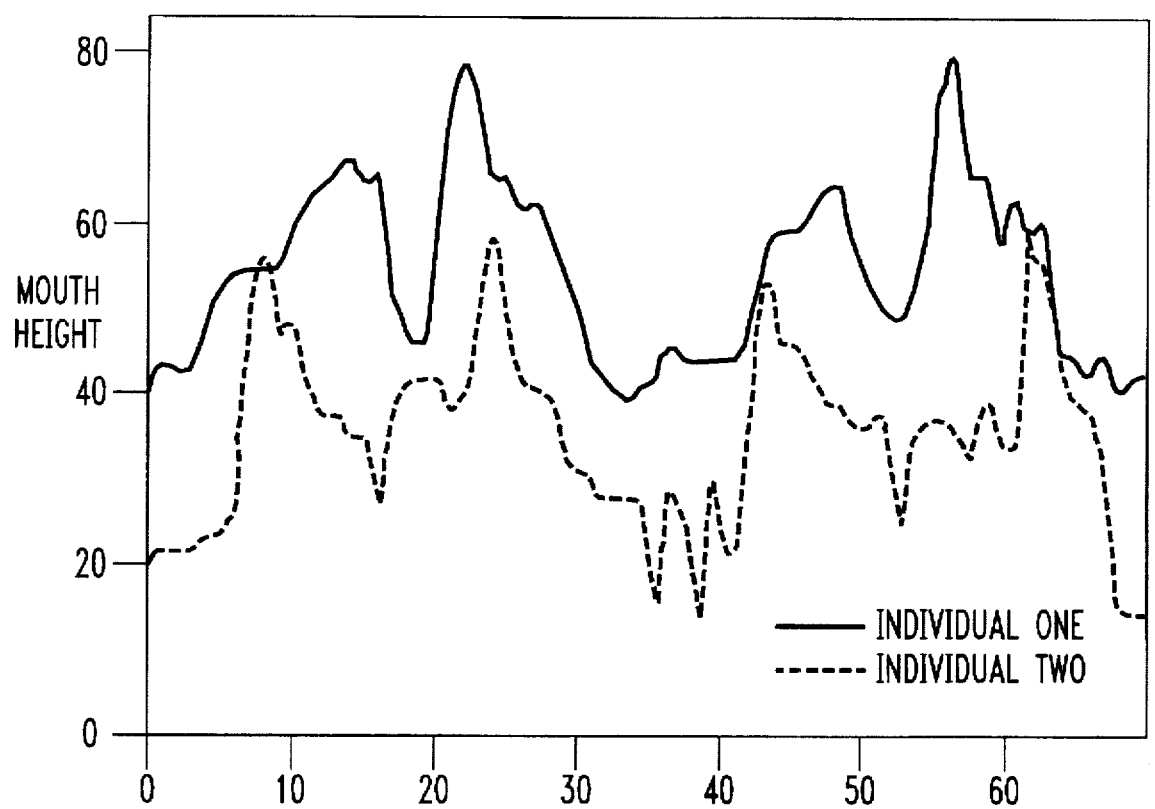
FIG. 3 shows the variation in distance between points on a mouth for two individuals each repeating the same phrase twice.

FIG. 1 shows a flowchart illustrating the steps to be performed when an individual attempts to obtain authorization. In step 101, the individual is requested to repeat a selected phrase or password so that audio and video data may be compared to the corresponding data in a database. As previously noted, this phrase may be selected by the individual or the individual may be requested to use a preselected phrase or password. In step 103, pertinent identifying features must be extracted from the data so that the comparison can be performed. Such pertinent video features may include, for example, the variation in distance between several lip points over the time the phrase or password is spoken. As seen in FIG. 2, for example, six points may be used, including the two corners of the mouth and two points each on the upper and lower lips. These identifying video features may be extracted from the video data by any known extraction technique, including mouth model techniques such as the model-based audiovisual coding method disclosed in T. Chen et al., "Lip Synchronization Using speech-Assisted Video Processing," IEEE Signal Processing Letters, vol. 2, no. 4, pp. 57–59, April 1995. FIG. 3 show the variations in distance over time between points on the lip of two individuals saying "Hello! How are you?" twice. While the lip movements vary a great deal from individual to individual they remain quite consistent when the same person repeats the same phrase.

Similar to the video features, pertinent audio features may be extracted by any known method. For example, the selected audio features may include the LPC cepstrum coefficients such as disclosed in L. R. Rabiner and R. W. Schafer, *Digital Processing of Speech Signals*, Bell Laboratories, 1978.

Once identifying audio and video features have been extracted, a single vector is formed in step 105. The vector varies over the duration of the spoken phrase and includes the parameters of both the audio and video features that have been extracted in step 103. In step 107 the vector is compared to the feature vector of a validated individual which is stored in a database. The comparison, in which two vectors are compared that are both function of time, may be performed by any known method. One particularly suitable method commonly used in speech recognition is time-warped matching (i.e., time alignment/normalization). Time-warped mapping is disclosed, for example, in H. F. Silverman et al., "The Application of Dynamic Programming to Connected Speech Recognition", IEEE ASSP Magazine, July 1990, pp. 7–26. One of ordinary skill in the art will recognize that time-warped mapping as used in speech recognition may be readily extended in a straight-forward manner to vectors that include both audio and video parameters. In step 109, if the warping required to make the match is above a prescribed threshold or if matching is not even possible, the user is declared unauthorized and access can be denied. If the match is below a prescribed threshold, authorization is granted.

Figure 4:
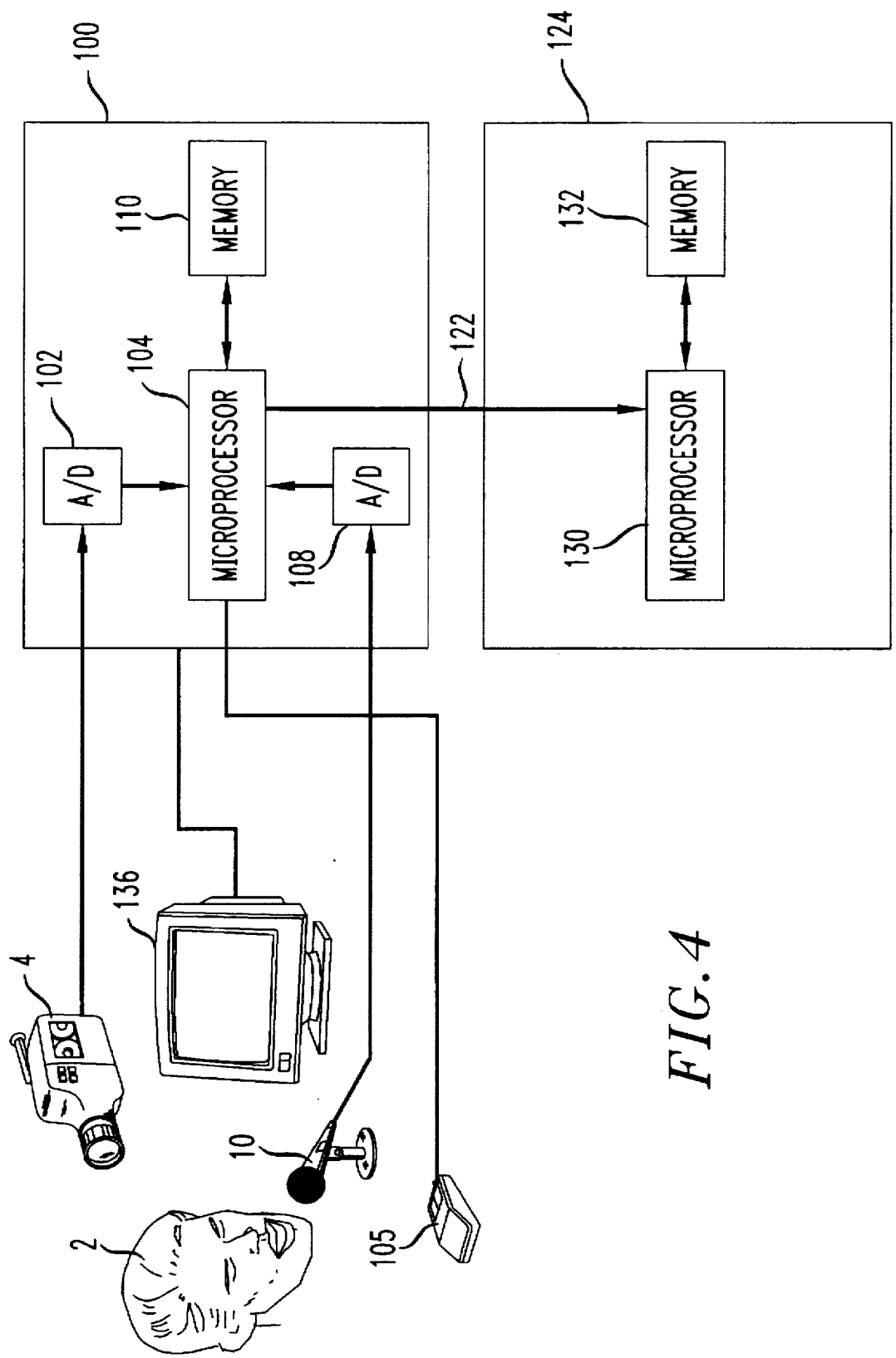
FIG. 4 shows a simplified block diagram of one embodiment of the apparatus in accordance with the present invention.

FIG. 4 shows a simplified block diagram of a client 100 and server 124 interconnected via a communications network 103. The present invention may be employed by the client 100 to gain access to the server 124. In one embodiment of the invention, the client 100 obtains audio and video information with a camera 4 and microphone 10 from a user 2 who desires access to the server 124. An A/D converter 102 transfers the information to the microprocessor 104. The client 100 also performs the feature extraction steps in microprocessor 104. The features may then be transmitted to the server 124 where the features are matched in microprocessor 130 to the features of an authorized user stored in database 132. This arrangement is particularly suitable, for example, when the client 100 is a computer attempting to access a network such as the Internet.

Since the authentication need not be performed in real-time, it is possible to use a very robust matching algorithm with reasonable complexity. Furthermore, authentication is easier than identification because users identify themselves at the beginning, eliminating the need for comparing the new data with the entire data base.

In an alternative embodiment of the invention, the feature extraction steps and the matching steps may be performed in a single location and even in the same processor. Such an arrangement may be desirable when the inventive authentication method is employed to gain access to a room or building, for example. Finally, in yet another embodiment of the invention the client may simply transmit the audio and video data to the server so that both the feature extraction steps and the matching steps may be performed in the server. This arrangement may be used, for example, when the client is not a computer but simply a data input terminal such as an ATM machine.

In some cases it may be advantageous to request the user's assistance during the authentication process because unguided mouth tracking and arbitrary head alignment may cause difficulty in determining a match. Accordingly, the image of the user 2 may be displayed on a video monitor visible to the user. In FIG. 4, for example, when the user is ready to repeat the phrase or password into the camera 4 and microphone 10, the user's image appears on the video monitor 136 and the user is requested to indicate with a mouse 105, for example, the location of his or her eyes and corners of the mouth. The user also may be requested to maintain his or her nostrils on opposite sides of a line displayed on the monitor 136 to ensure proper orientation. Alternatively, a generic facial template may be displayed for proper orientation.

When the user attempts authentication, a facial template of the user stored in the database may be displayed on the monitor 136 so that the user can properly adjust his or her location and orientation with respect to the camera so that facial features align with the template. For ease of operation, it may be advantageous for the monitor 136 to display a mirror image rather than the video as it directly comes from the camera. This arrangement allows the user to more easily adjust his/her position with respect to the template.

In some case it may be difficult or impossible to remotely perform the matching step because the network over which the data is transmitted employs video coding. Since in this case full frame-rate video cannot be obtained from the user, matching may be performed with only a subset of the feature vectors stored in the database. Since only the video is encoded, the audio features first undergo a matching step to determine the proper time-warping function. Once this function is known, a subset of the feature vectors stored in the database are matched with the video features transmitted over the network. Alternatively, if the audio data is degraded by encoding or other reasons, this procedure can be reversed so that the video data first undergoes a matching step to determine the time-warping function. Furthermore, in some cases the audio and video channels may be not in proper synchronization. In this case the time-warping functions used to determine the match can be performed separately on the audio and video.

We claim:

1. A method for determining authenticity of an individual, said method comprising the steps of:

obtaining audio data of the individual speaking at least one selected phrase;

obtaining video data of the individual speaking said at least one selected phrase;

extracting identifying audio features and video features from said audio data and said video data, respectively, said audio and video features including temporal variations in said audio data and video data, respectively;

forming a feature vector that incorporates said audio features and said video features;

comparing said feature vector to a stored feature vector of a validated user speaking said at least one selected phrase; and authenticating said individual if said feature vector and said stored feature vector form a match within a prescribed threshold.

2. The method of claim 1 further comprising the step of prompting the individual to speak a predetermined password.

3. The method of claim 2 wherein said password is selected by the individual.

4. The method of claim 1 wherein the step of extracting identifying audio features comprises the step of extracting variations in distance among a plurality of points on lips of the individual over a period of time.

5. The method of claim 4 wherein said plurality of points include two points on corners of the lips, two points on an upper lip and two points on a lower lip.

6. The method of claim 1 wherein the step of extracting identifying video features employs a mouth model.

7. The method of claim 6 wherein the step of extracting identifying audio features employs LPC cepstrum coefficients.

8. The method of claim 7 wherein the step of comparing said feature vector to a stored feature vector employs time-warped mapping.

9. The method of claim 6 wherein said mouth model employs model-based audiovisual coding.

10. The method of claim 1 wherein the step of extracting identifying audio features employs LPC cepstrum coefficients.

11. The method of claim 1 wherein the step of comparing said feature vector to a stored feature vector employs time-warped mapping.

12. The method of claim 1 wherein the step of obtaining video data includes the step of displaying a previously stored facial template.

13. The method of 12 wherein said monitor displays a mirror image of the facial template.

14. An apparatus for determining authenticity of an individual, comprising:

means for obtaining audio data and video data of the individual speaking at least one selected phrase;

means for extracting identifying audio features and video features from said audio data and said video data, respectively, said audio and video features including temporal variations in said audio data and video data, respectively;

means for forming a feature vector that incorporates said audio features and said video features; and means for comparing said feature vector to a stored feature vector of a validated user speaking said at least one selected phrase to determine if a match is formed above a prescribed threshold.

15. The apparatus of claim 14 wherein said means for obtaining audio data and video data is a camera and microphone.

16. The apparatus of claim 14 wherein said forming means and said comparing means is geographically remote from said extracting means.

17. The apparatus of claim 16 wherein said extracting means is a data input terminal.

18. The apparatus of claim 16 wherein said extracting means is a client and said forming means and said comparing means is a server in communication with said client.

19. The apparatus of claim 14 wherein said forming means and comparing means is geographically co-located with said extracting means.

20. The apparatus of claim 19 wherein said forming means, said comparing means and said extracting means employ a common processor.

21. The apparatus of claim 14 wherein said means for obtaining audio and video data includes a monitor on which the individual is observable.

22. The apparatus of claim 21 wherein said monitor displays a previously stored facial template.

23. The apparatus of claim 22 wherein said monitor displays a mirror image of the facial template.

* * * * *